US011747506B2

(12) United States Patent
Boulaknadal et al.

(10) Patent No.: US 11,747,506 B2
(45) Date of Patent: Sep. 5, 2023

(54) DUAL RANGE MICRO-RESISTIVITY MEASUREMENT METHOD (71) Applicants: Youssef Boulaknadal, Houston, TX (US); Stanislav Forgang, Houston, TX (US); Peter Withers, Hook (GB)

(72) Inventors: Youssef Boulaknadal, Houston, TX (US); Stanislav Forgang, Houston, TX (US); Peter Withers, Hook (GB)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 78 days.

(21) Appl. No.: 17/392,851

(22) Filed: Aug. 3, 2021

(65) Prior Publication Data
US 2023/0037403 A1 Feb. 9, 2023

(51) Int. Cl.
G01V 3/24 (2006.01)
G01V 3/28 (2006.01)
G01V 3/38 (2006.01)
E21B 49/00 (2006.01)

(52) U.S. Cl.
CPC .............. G01V 3/24 (2013.01); G01V 3/28 (2013.01); G01V 3/38 (2013.01); E21B 49/00 (2013.01)

(58) Field of Classification Search
None
See application file for complete search history.

(56) References Cited

U.S. PATENT DOCUMENTS

| 6,426,625 B1* | 7/2002 | Samworth ............... G01V 3/24 324/371 |
| 8,400,158 B2 | 3/2013 | Tabarovsky et al. |
| 11,095,974 B1 | 8/2021 | Wheeler |
| 2009/0309602 A1 | 12/2009 | Wang |
| 2011/0089951 A1* | 4/2011 | Wang ..................... G01V 3/24 324/369 |
| 2017/0212269 A1 | 7/2017 | Itskovich et al. |

FOREIGN PATENT DOCUMENTS

WO 2017184164 A1 10/2017

OTHER PUBLICATIONS

International Search Report Issued in International Application No. PCT/US2022/037587 dated Nov. 3, 2022; 3 Pages.
Written Opinion Issued in International Application No. PCT/US2022/037587 dated Nov. 3, 2022; 4 Pages.

* cited by examiner

Primary Examiner — Douglas X Rodriguez
(74) Attorney, Agent, or Firm — CANTOR COLBURN LLP (57) ABSTRACT A resistivity imaging device and a method of operating the resistivity imaging device in a wellbore. The resistivity imaging device includes a first electrode, a second electrode, and a circuit electrically coupled to the first electrode and the second electrode. An impedance is measured of a formation surrounding the wellbore. Based on the impedance, the circuit is configured into one of a first circuit configuration for operating the resistivity imaging device in a first mode and a second circuit configuration for operating the resistivity imaging device in a second mode. The resistivity imaging device is operated using the circuit in the one of the first circuit configuration and the second circuit configuration.

8 Claims, 6 Drawing Sheets

FIG.7 ized, the cable 108 includes a stress

DUAL RANGE MICRO-RESISTIVITY MEASUREMENT METHOD

BACKGROUND

In the resource recovery industry, formation resistivity measurements are used to determine the lithology of a downhole formation. A tool having an articulated pad with a transmit electrode and return electrode is conveyed downhole into a wellbore in the formation. A high frequency electrical current is sent into the formation from the transmit electrode and a return current is received at the return electrode. An impedance of the formation can be determined by measuring the current through the formation and the voltage between transmit electrode and return electrode. The lithology can then be determined from the impedance. However, due to the pad being electrically connected to the mandrel of the tool, current can leak into the body of the pad and thus into the mandrel, which affects current and voltage measurements and resultant impedance values, thereby leading to poor lithology determination. Accordingly, there is a need for reducing or preventing current leakage into the mandrel during formation resistivity measurements.

SUMMARY

Disclosed herein is a method of operating a resistivity imaging device in a wellbore. An impedance is measured of a formation surrounding the wellbore. A circuit of the resistivity imaging device is configured into one of a first circuit configuration for operating the resistivity imaging device in a first mode and a second circuit configuration for operating the resistivity imaging device in a second mode, based on the impedance of the formation. The resistivity imaging device is operated using the circuit in the one of the first circuit configuration and the second circuit configuration.

Also disclosed herein is a resistivity imaging device. The resistivity imaging device includes a first electrode, a second electrode, and a circuit electrically coupled to the first electrode and the second electrode, wherein the circuit is configurable based on an impedance of a formation surrounding the resistivity imaging device into one of a first circuit configuration for operating the first electrode and the second electrode in a first mode and a second circuit configuration for operating the first electrode and the second electrode in a second mode.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
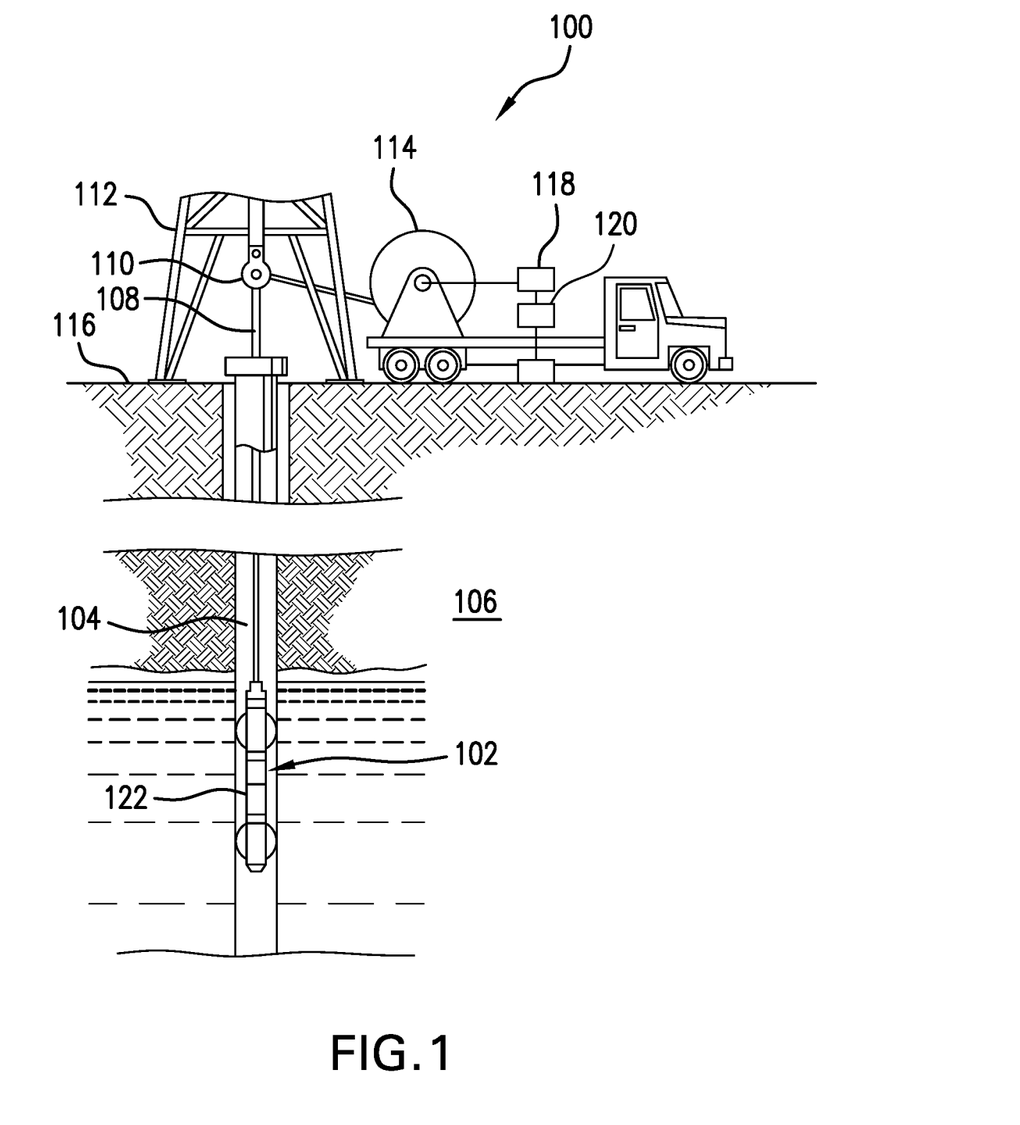
FIG. 1 shows a system for deploying a wireline tool in a wellbore within a formation.

Referring to FIG. 1, a system 100 for deploying a wireline tool 102 in a wellbore 104 within a formation 106 is illustrated in an embodiment. The wireline tool 102 includes at least one device (e.g., a resistivity imaging device having the ability to measure both magnitude and phase of an imaging current) for measuring a parameter of the formation. The wireline tool 102 is lowered into the wellbore 104 from a cable 108 that passes over a sheave 110 mounted on a drilling rig 112. Typically, the cable 108 includes a stress member and various conductors for transmitting commands to the wireline tool 102, for receiving data from the wireline tool 102 as well as providing power. The wireline tool 102 is raised and lowered by draw works 114. At the surface 116, an electronics module 118 transmits the required operating commands downhole and in return, receives data back. The data may be recorded on an archival storage medium of any desired type for concurrent or later processing. The data may be transmitted in analog or digital form. Data processors such as a computer 120 may be provided for performing data analysis in the field in real time or the recorded data may be sent to a processing center or both for post processing of the data. It shall be understood, however, that the wireline tool 102 can also include one or more processors 122. Accordingly, in the embodiments disclosed below, processing of receiving information can take place at either or both the computer 120 and the one or more processors 122. Furthermore, the computer 120 can be formed by a plurality of computing devices in certain instances.

Figure 2:
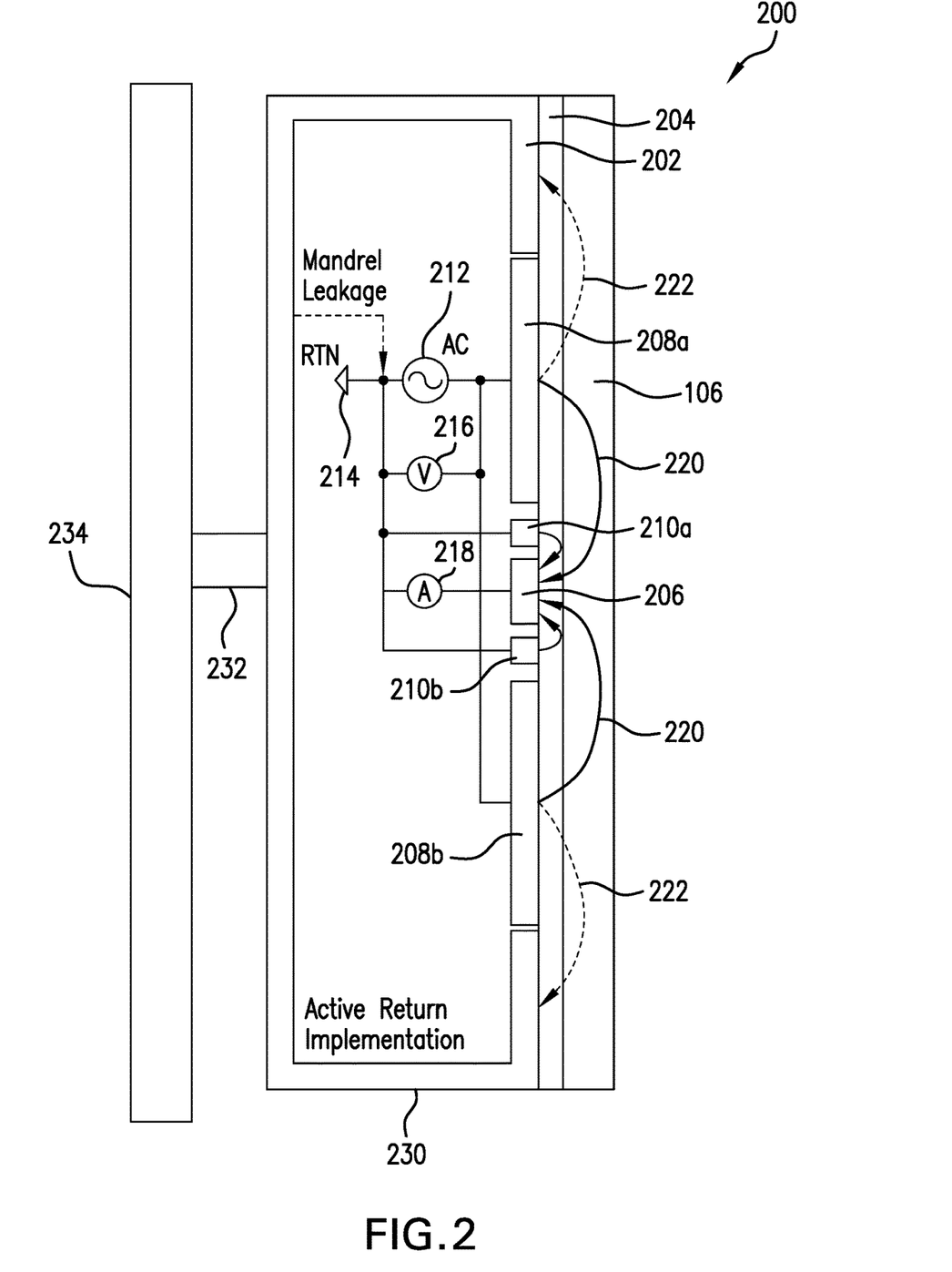
FIG. 2 shows a resistivity imaging device conveyed by the wireline tool of FIG. 1 for formation resistivity imaging.

FIG. 2 shows a resistivity imaging device 200 conveyed by the wireline tool 102 of FIG. 1 for formation resistivity imaging, in an embodiment. The resistivity imaging device 200 is disposed within a pad 202 of the wireline tool 102. The pad 202 includes a housing 230 and arms 232 that connect the housing 230 to a mandrel 234 of the wireline tool 102 and which can be moved to extend the housing 230 from the mandrel 234 when the wireline tool 102 has reached a selected depth of the wellbore 104. The housing 230 and arms 232 are integral parts of the resistivity imaging device 200 and are not electrically isolated from each other or from the mandrel 234.

The pad 202 includes an electrode section having electrodes that are more or less aligned with an outer surface of the pad 202 and electrically isolated from the housing 230 and thus electrically isolated from the mandrel. When disposed in the wellbore, the resistivity imaging device 200 and pad 202 are placed up against a wall of the wellbore 104. In general, a thin layer of mud 204 lies between the resistivity imaging device 200 (i.e., pad 202 and electrodes) and the formation 106 during the imaging process. The resistivity measurements can include impedance measurements.

In an embodiment, the electrode section includes a button electrode 206, a first plate electrode 208a, a second plate electrode 208b, a first guard electrode 210a, and a second guard electrode 210b. The first plate electrode 208a is located at one end of the button electrode 206 (e.g., uphole of the button electrode 206) with the first guard electrode 210a disposed between the first plate electrode 208a and the button electrode 206. A second plate electrode 208b is located at an opposite end of the button electrode 206 (e.g., downhole of the button electrode 206) with the second guard electrode 210b is disposed between the second plate electrode 208b and the button electrode 206. The resistivity imaging device 200 can be operated in a first mode (an active pad mode) and a second mode (an active button mode), as discussed herein with respect to FIGS. 2 and 3. It is to be understood the arrangement of electrodes discussed herein is not meant as a limitation of the invention.

FIG. 2 shows the resistivity imaging device 200 of the wireline tool 102 operating in a first mode (active pad mode). The electronics section includes an electronic circuit incorporating a voltage source 212, a voltmeter 216 and an ammeter 218. The voltage source 212 applies a voltage to the first plate electrode 208a and the second plate electrode 208b while the button electrode 206 is connected to ground 214. The voltmeter 216 measures the voltage across the plate electrodes 208a, 208b and the button electrode 206. The ammeter 218 measures a current through the button electrode 206.

When the voltage is applied at the first plate electrode 208a and the second plate electrode 208b, a formation current 220 is generated to flow through formation. Due to the presence of the mud 204, the formation current 220 is biased to flow through the mud 204 rather than through the formation 106. The guard electrodes 210a, 210b focuses the electric field lines from the plate electrodes 208a, 208b into the formation 106 to ensure that the formation current 220 passes primarily through the formation 106 rather than the mud 204. Additionally, the voltage applied at the plate electrodes 208a, 208b causes a leakage current 222 between the plate electrodes 208a, 208b and the mandrel as the common ground 214 of the electronics section is connected to the housing 230. However, even when there is no connection between housing 230 and common ground 214, the leakage current 222 can return to the voltage source 212 through unavoidable construction capacitance between an electronics board of the electronics section and an internal surface of the housing 230. The appearance of leakage current 222 distorts the readings of the formation current 220 and therefore affects the resulting resistivity measurements.

Figure 3:
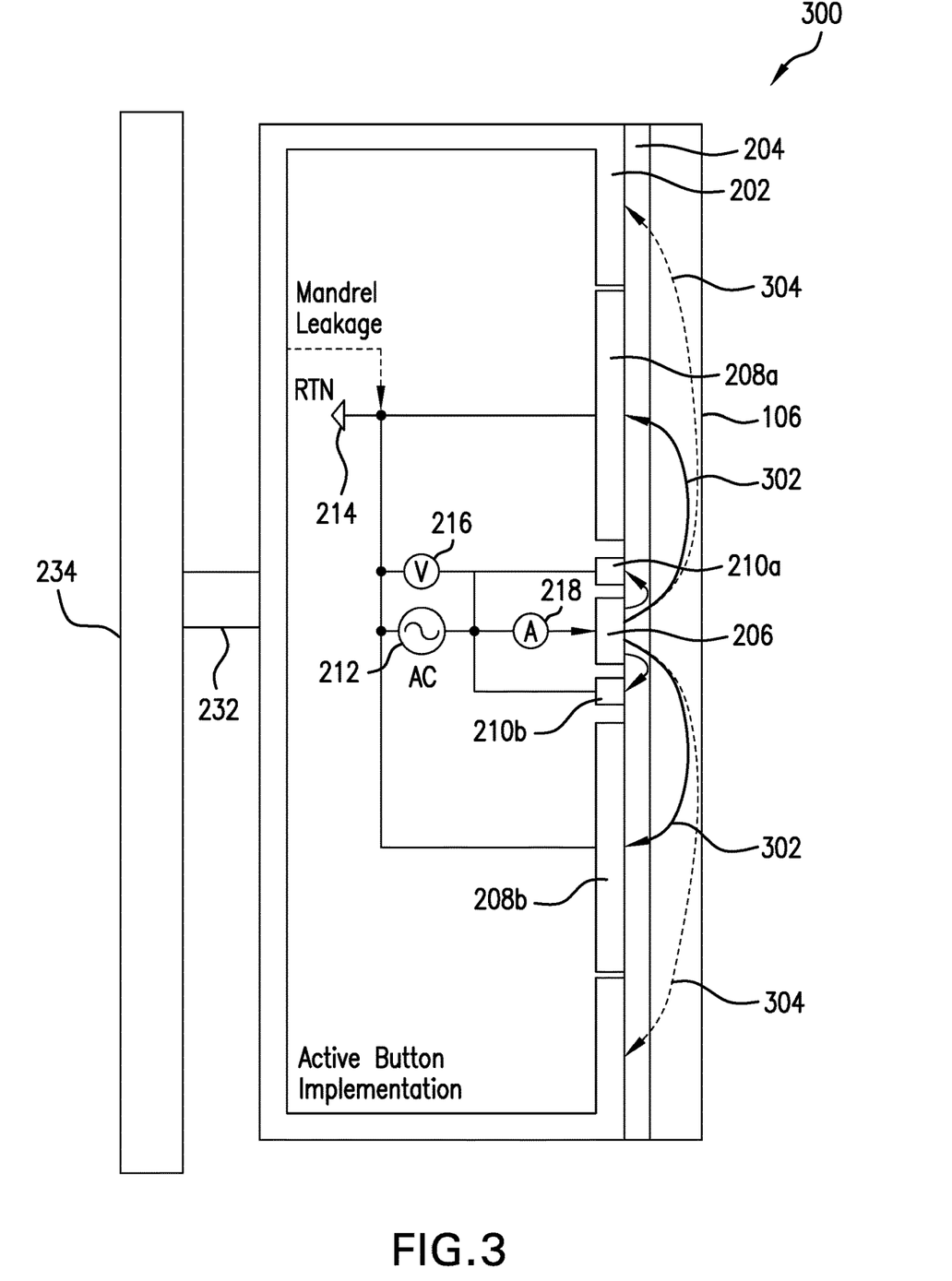
FIG. 3 shows an alternative resistivity imaging device conveyed by the wireline tool.

FIG. 3 shows an alternative resistivity imaging device 300 conveyed by the wireline tool 102 of FIG. 1 for formation resistivity imaging using a second mode (active button mode). It can be seen from a comparison of FIG. 2 and FIG. 3 that the connections between the voltage source 212, voltmeter 216, ammeter 218 are different for each mode of operation. In the active button mode, the voltage source 212 applies a voltage to the button electrode 206 while the first plate electrode 208a and the second plate electrode 208b are connected to ground 214. Voltmeter 216 measures the voltage across the voltage source 212. Ammeter 218 measures a current being sent through the button electrode 206. When the voltage is applied at the button electrode 206, a formation current is generated for flow through the mud 204 and into the formation, to be received at the plate electrodes 208a, 208b. A guard voltage applied at the guard electrodes 210a, 210b forces the formation current into the formation 106. Due to the presence of the pad 202, a portion of the formation current 302, referred to as a leakage current 304 is lost to the pad 202 rather than returning via either the first plate electrode 208a or the second plate electrode 208b. The presence of the leakage current 304 still affect the resulting resistivity measurements (although on a smaller scale when compared to the effect of the leakage current in the first mode (i.e., the active pad mode).

Figure 4:
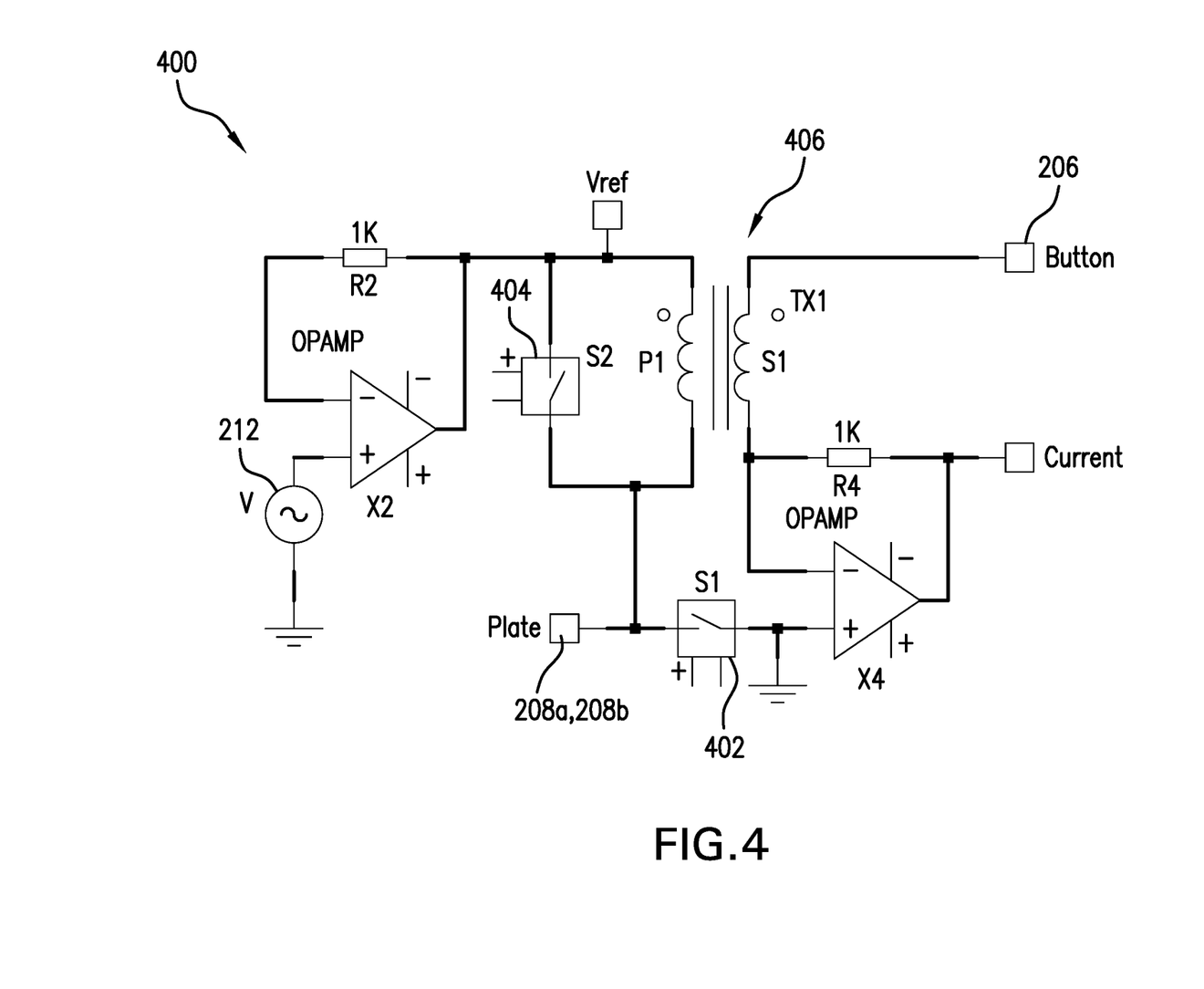
FIG. 4 shows a schematic diagram of a circuit for alternating between the active pad mode shown in FIG. 2 and the active button mode shown in FIG. 3.

FIG. 4 shows a schematic diagram of a circuit 400 for alternating between the active pad mode shown in FIG. 2 and the active button mode shown in FIG. 3. The circuit 400 includes the voltage source 212 and a first switch 402 (S1) and a second switch 404 (S2) for changing the mode of the circuit. When the first switch 402 (S1) is closed and the second switch 404 (S2) is open, the circuit is in an active button mode, with the button electrode 206 at $V_{ref}$ and the plate electrodes 208a, 208b—at the ground. When the first switch 402 (S1) is open and the second switch 404 (S2) is closed, the circuit 400 is in an active plate mode, with the plate electrodes 208a, 208b at $V_{ref}$ and the button electrode connected to ground.

In various embodiments, a processor (such as one or more processors 122) can obtain the measurements of voltage and current (from voltmeter 216 and ammeter 218, respectively) and determine in which mode to operate the circuit 400. When the measured formation resistivity is low, leakage current from the button electrode 206 is reduced, thereby indicating the desirability of the active button mode. When the measured formation resistivity is high, leakage current from the button electrode 206 is prominent, thereby indicating the desirability of the active plate mode. The processor can place the switches S1 and S2 into selected states or configurations for producing either a first circuit configuration suitable for operating the resistivity imaging device 200 in an active button mode or a second circuit configuration suitable for operating the resistivity imaging device 200 in an active plate mode.

In one embodiment, the selection of the first mode and the second can be made based on a phase of a measured impedance of the formation. When the phase of the impedance of the formation is within a range between about 75 degrees and 90 degrees, this indicates a low formation resistivity and the active button mode is selected (i.e., switch S1 is closed and S2 is open). When the phase of the impedance of the formation with outside of this range, this indicates a high formation resistivity and the active plate mode is selected (i.e., switch S1 is open and S2 is closed).

Figure 5:
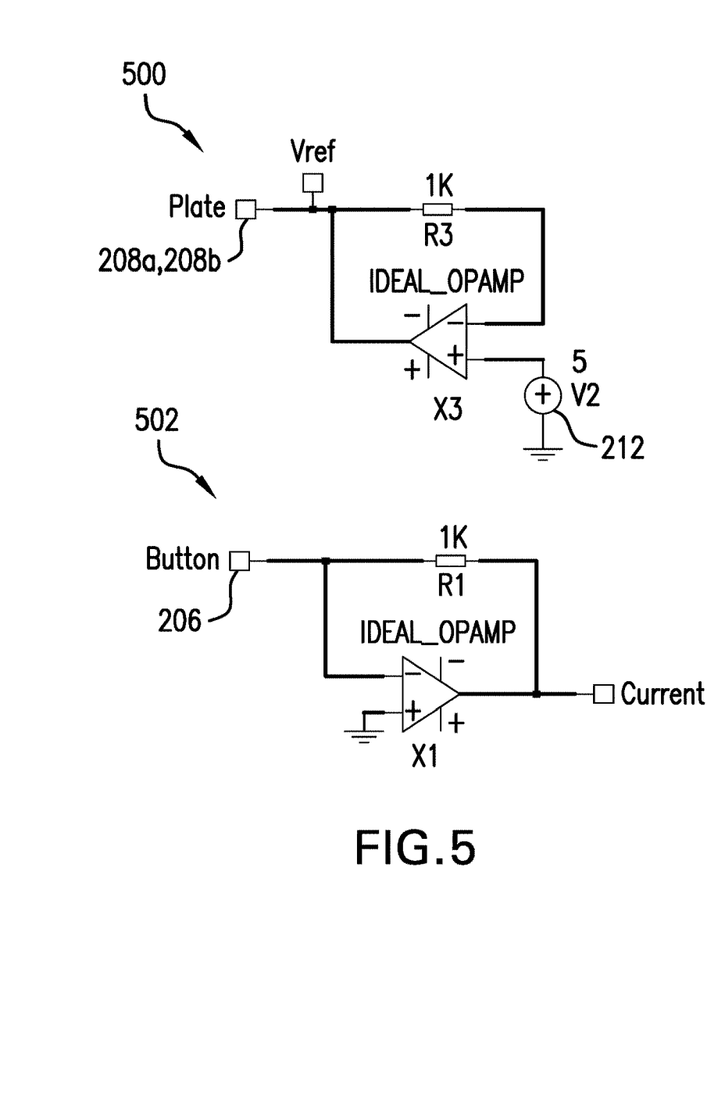
FIG. 5 shows a first circuit configuration for operating the resistivity imaging device in an active plate mode.

FIG. 5 shows a first circuit configuration for operating the resistivity imaging device in an active plate mode. The first circuit configuration is obtained by opening the first switch S1 and closing the second switch S2 in the circuit 400 of FIG. 4. In the first circuit configuration, the circuit 400 is split into a plate circuit 500 and a button circuit 502. In the plate circuit 500, the plate electrodes 208a, 208b is held at a reference voltage $V_{ref}$, which is controlled by voltage source 212. In the button circuit 502, the button electrode 206 is held at ground.

Figure 6:
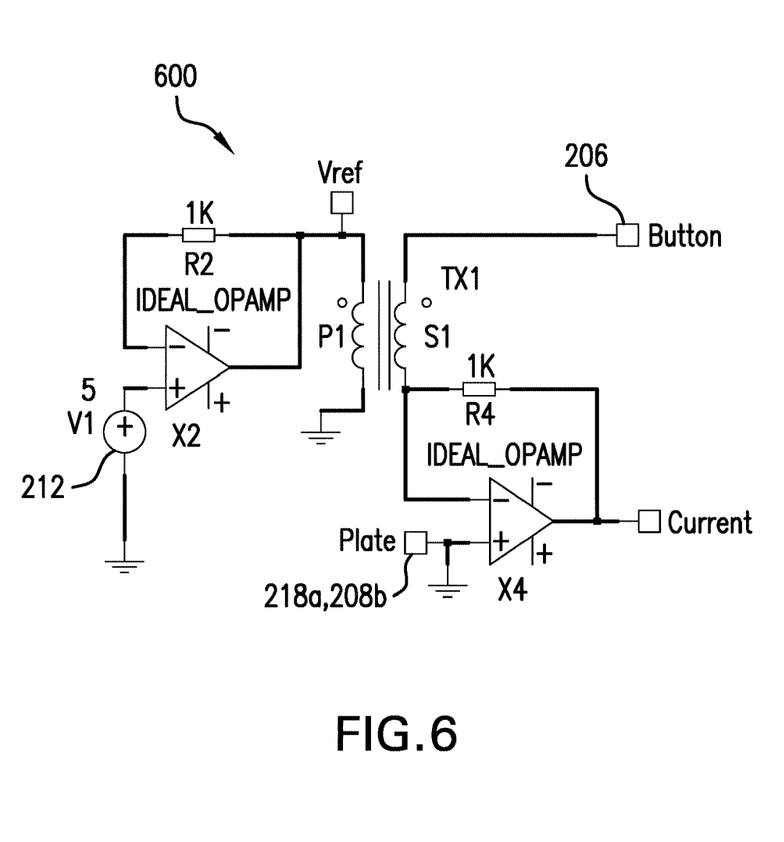
FIG. 6 shows a second circuit configuration for operating the resistivity imaging device in an active button mode.

FIG. 6 shows a second circuit configuration 600 for operating the resistivity imaging device in an active button mode. The second circuit configuration 600 is obtained by closing the first switch S1 and opening the second switch S2 in the circuit 400 of FIG. 4. In the second circuit configuration 600, the plate electrodes 208a, 208b are held at a ground and the button electrode 206 is held at a reference voltage.

Figure 7:
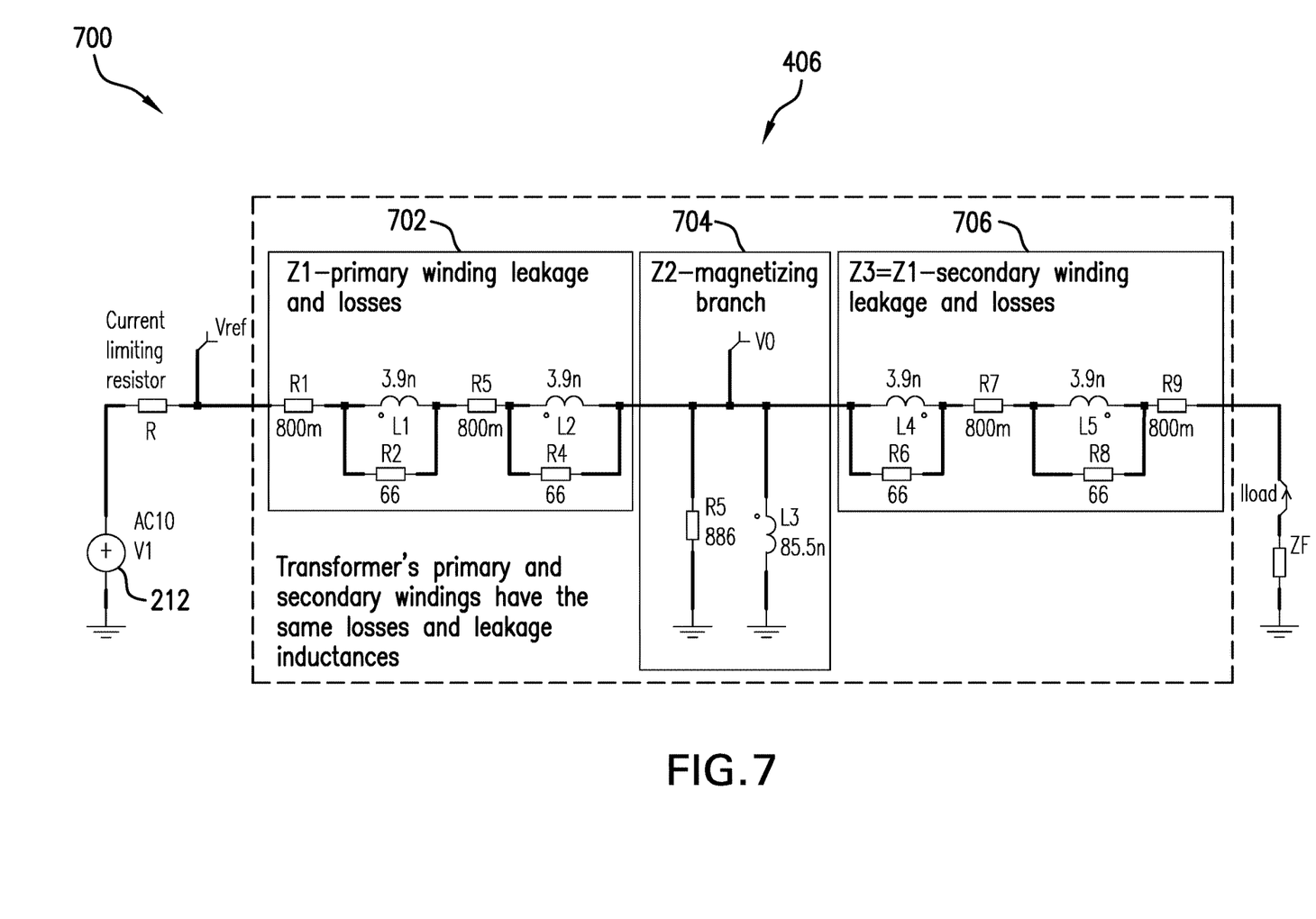
FIG. 7 shows a model of the transformer of the circuit of FIG. 4.

FIG. 7 shows a model of the transformer 406 of the circuit 400 FIG. 4. The transformer 406 includes a primary winding 702, magnetizing branch 704 and secondary winding 706. The primary winding 702 has an impedance Z1. The magnetizing branch 704 has an impedance Z2. The secondary winding 706 has an impedance Z3. For the transformer 406, the impedance Z3 is the same as the impedance Z1 (Z3=Z1). The reference voltage $V_f$ is shown at a point between the voltage source 212 and the primary winding 702.

The transformer 406 is disposed between the voltage source 212 and a button electrode having a button impedance $Z_f$. The button load can be calculated as a ratio of the reference voltage to the load current $I_{load}$. The button impedance $Z_f$ is given in Eq. (1):

$$Z_f = \frac{V_0}{I_{load}} - Z_1 = \left[\left(\frac{V_{ref}}{I_{load}} - Z_1\right) / (Z_1 + Z_2)\right] - Z_1 \quad \text{Eq. (1)}$$

where $I_{load}$ is the button current and $V_0$ is a voltage at the transformer 406. When the primary winding 702 is shorted (by closing switch S2), the primary winding 702 and the magnetizing branch 704 are in parallel. The secondary winding 706 is then in series with the formation/button electrode. Given that $Z_1=Z_3$, the resulting button impedance $Z_f$ is shown in Eq. (2):

$$Z_f = \frac{V_{ref}}{I_{load}} - Z_3 - \frac{Z_3 \cdot Z_2}{Z_3 + Z_2} = \frac{V_{ref}}{I_{load}} - Z_1 - \frac{Z_1 \cdot Z_2}{Z_1 + Z_2} \quad \text{Eq. (2)}$$

With the voltage source 212 having an operating frequency of 10 Megahertz (Mhz), the internal button load impedance $$Z_1 + \frac{Z_1 \cdot Z_2}{Z_1 + Z_2}$$

is about 1.5 ohms. With a formation resistance of 250 ohms, the impedance is only 0.6% of the formation resistance and is therefore has an insignificant effect on the impedance measurements.

Set forth below are some embodiments of the foregoing disclosure:

Embodiment 1: A method of operating a resistivity imaging device in a wellbore. An impedance is measured of a formation surrounding the wellbore. A circuit of the resistivity imaging device is configured into one of a first circuit configuration for operating the resistivity imaging device in a first mode and a second circuit configuration for operating the resistivity imaging device in a second mode, based on the impedance of the formation. The resistivity imaging device is operated using the circuit in the one of the first circuit configuration and the second circuit configuration.

Embodiment 2: The method of any prior embodiment, wherein the circuit further includes a first switch and a second switch, wherein configuring the circuit into one of the first circuit configuration and the second circuit configuration further includes changing a state of the first switch and the second switch.

Embodiment 3: The method of any prior embodiment, wherein configuring the circuit into the first circuit configuration further includes closing the first switch and opening the second switch to place a button electrode of the resistivity imaging device at a reference voltage and a plate electrode of the resistivity imaging device at ground.

Embodiment 4: The method of any prior embodiment, wherein configuring the circuit into the second circuit configuration further includes opening the first switch and closing the second switch to place the button electrode at ground and the plate electrode at the reference voltage.

Embodiment 5: The method of any prior embodiment, wherein the circuit includes a transformer, wherein closing the second switch shorts a primary winding of the transformer.

Embodiment 6: The method of any prior embodiment, further including measuring a phase of the impedance of the formation and placing the circuit in the first circuit configuration when the phase of the impedance of the formation is between about 75 degrees and about 90 degrees.

Embodiment 7: The method of any prior embodiment, further including measuring the impedance of the formation with the resistivity imaging device operating in one of the first mode and the second mode.

Embodiment 8: A resistivity imaging device. The resistivity imaging device includes a first electrode, a second electrode, and a circuit electrically coupled to the first electrode and the second electrode, wherein the circuit is configurable based on an impedance of a formation surrounding the resistivity imaging device into one of a first circuit configuration for operating the first electrode and the second electrode in a first mode and a second circuit configuration for operating the first electrode and the second electrode in a second mode.

Embodiment 9: The resistivity imaging device of any prior embodiment, further including a processor configured to determine the impedance of the formation and to configure the circuit into one of the first circuit configuration and the second circuit configuration based on the impedance.

Embodiment 10: The resistivity imaging device of any prior embodiment, wherein the circuit further includes a first switch and a second switch, wherein the processor is further configured to place the circuit in the one of the first circuit configuration and the second configuration by changing a state of the first switch and of the second switch.

Embodiment 11: The resistivity imaging device of any prior embodiment, wherein the processor is further configured to close the first switch and open the second switch to place the first electrode at a reference voltage and the second electrode at ground in the first mode.

Embodiment 12: The resistivity imaging device of any prior embodiment, wherein the processor is further configured to open the first switch and close the second switch to place the first electrode at ground and the second electrode at a reference voltage in the second mode.

Embodiment 13: The resistivity imaging device of any prior embodiment, wherein the circuit includes a transformer, wherein closing the second switch shorts a primary winding of the transformer.

Embodiment 14: The resistivity imaging device of any prior embodiment, wherein the processor is further configured to place the circuit in the first circuit configuration when a phase of the impedance of the formation is between about 75 degrees and about 90 degrees.

Embodiment 15: The resistivity imaging device of any prior embodiment, wherein the first electrode is a button electrode and the second electrode is a plate electrode.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of operating a resistivity imaging device in a wellbore, comprising:
    measuring an impedance of a formation surrounding the wellbore;
    configuring a circuit of the resistivity imaging device into one of a first circuit configuration for operating the resistivity imaging device in a first mode and a second circuit configuration for operating the resistivity imaging device in a second mode, based on the impedance of the formation,
    wherein the circuit further comprises a first switch and a second switch and configuring the circuit into the first circuit configuration comprises closing the first switch and opening the second switch to place a button electrode of the resistivity imaging device at a reference voltage and a plate electrode of the resistivity imaging device at ground and configuring the circuit into the second circuit configuration further comprises opening the first switch and closing the second switch to place the button electrode at ground and the plate electrode at the reference voltage; and
    operating the resistivity imaging device using the circuit in the one of the first circuit configuration and the second circuit configuration.

2. The method of claim 1, wherein the circuit includes a transformer, wherein closing the second switch shorts a primary winding of the transformer.

3. The method of claim 1, further comprising measuring a phase of the impedance of the formation and placing the circuit in the first circuit configuration when the phase of the impedance of the formation is between about 75 degrees and about 90 degrees.

4. The method of claim 1, further comprising measuring the impedance of the formation with the resistivity imaging device operating in one of the first mode and the second mode.

5. A resistivity imaging device, comprising:
    a first electrode;
    a second electrode;
    a circuit including a first switch and a second switch, the circuit electrically coupled to the first electrode and the second electrode, wherein the circuit is configurable based on an impedance of a formation surrounding the resistivity imaging device into one of a first circuit configuration for operating the first electrode and the second electrode in a first mode and a second circuit configuration for operating the first electrode and the second electrode in a second mode; and
    a processor configured to close the first switch and open the second switch to place the first electrode at a reference voltage and the second electrode at ground in the first mode and to open the first switch and close the second switch to place the first electrode at ground and the second electrode at a reference voltage in the second mode.

6. The resistivity imaging device of claim 5, wherein the circuit includes a transformer, wherein closing the second switch shorts a primary winding of the transformer.

7. The resistivity imaging device of claim 5, wherein the processor is further configured to place the circuit in the first circuit configuration when a phase of the impedance of the formation is between about 75 degrees and about 90 degrees.

8. The resistivity imaging device of claim 5, wherein the first electrode is a button electrode and the second electrode is a plate electrode.

* * * * *